(12) United States Patent
Koehler et al.

(10) Patent No.: US 11,807,368 B2
(45) Date of Patent: Nov. 7, 2023

(54) FLIGHT ATTENDANT SEAT AND METHOD FOR FITTING A FLIGHT ATTENDANT SEAT

(71) Applicant: Airbus Operations GmbH, Hamburg (DE)

(72) Inventors: Andreas Koehler, Hamburg (DE); Peter Bielik, Hamburg (DE); Jan-Ole Jedraszczyk, Hamburg (DE); Heiner Giszas, Hamburg (DE); Marcus Boerjesson, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 123 days.

(21) Appl. No.: 17/112,613

(22) Filed: Dec. 4, 2020

(65) Prior Publication Data

US 2021/0171203 A1    Jun. 10, 2021

Related U.S. Application Data

(63) Continuation of application No. 15/825,761, filed on Nov. 29, 2017, now Pat. No. 10,889,379.

(30) Foreign Application Priority Data

Nov. 30, 2016   (DE) .......................... 102016223771.3

(51) Int. Cl.
*B64D 11/06* (2006.01)
*B60N 2/30* (2006.01)

(52) U.S. Cl.
CPC ........ *B64D 11/0691* (2014.12); *B60N 2/3047* (2013.01); *B64D 11/06* (2013.01); *B64D 11/064* (2014.12); *B64D 11/0698* (2014.12)

(58) Field of Classification Search
CPC . B64D 11/0691; B64D 11/06; B64D 11/0698; B60N 2/686; A47C 1/126; A47C 9/06
(Continued)

(56) References Cited

U.S. PATENT DOCUMENTS 1,412,367 A  *  4/1922  Noack ................ B64D 11/0691
                                                     297/14
1,698,036 A  *  1/1929  Trammell ................ A47C 9/06
                                                     297/14
(Continued)

FOREIGN PATENT DOCUMENTS

CN        103261024 A      8/2013
DE        102005009750     9/2006
(Continued)

OTHER PUBLICATIONS

German Search Report, priority document.
(Continued)

*Primary Examiner* — Christopher D Hutchens
(74) *Attorney, Agent, or Firm* — Greer, Burns & Crain, Ltd.

(57) ABSTRACT

A flight attendant seat comprising a frame that can be mounted on a carrier fixture or integrated into the carrier fixture, and at least one seat arrangement integrated into the frame. The frame comprises a lower section, an upper section and a central section taking up the at least one seat arrangement, at least partially. The lower section is formed bent at least in a region adjoining the central section. A method is provided for fitting a flight attendant seat.

16 Claims, 9 Drawing Sheets

(58) Field of Classification Search
USPC .......................................................... 297/14
See application file for complete search history.

(56) References Cited

U.S. PATENT DOCUMENTS

| | | | | |
|---|---|---|---|---|
| 1,761,673 | A * | 6/1930 | Laursen | A47C 9/06 |
| | | | | 297/14 |
| 2,036,529 | A * | 4/1936 | Kindelberger | B64D 11/064 |
| | | | | 297/94 |
| 2,669,284 | A * | 2/1954 | Pall | B64D 11/064 |
| | | | | 297/367 R |
| 3,594,037 | A * | 7/1971 | Sherman | B64D 11/0691 |
| | | | | 297/14 |
| 3,873,151 | A * | 3/1975 | Morris | A47C 9/06 |
| | | | | 297/14 |
| 9,840,332 | B2 * | 12/2017 | Castanos | B64C 1/1423 |
| 2006/0202085 | A1 | 9/2006 | Schotte et al. | |
| 2010/0052401 | A1 | 3/2010 | Jessup et al. | |
| 2012/0025570 | A1 | 2/2012 | Reinck | |
| 2013/0206906 | A1 | 8/2013 | Burrows et al. | |
| 2013/0313365 | A1 * | 11/2013 | Ehlers | B64D 11/0691 |
| | | | | 244/118.6 |
| 2014/0084640 | A1 * | 3/2014 | Walker | A47C 9/06 |
| | | | | 297/14 |
| 2014/0224931 | A1 | 8/2014 | Weitzel et al. | |
| 2014/0265513 | A1 * | 9/2014 | Lambert | B64D 11/06 |
| | | | | 297/440.1 |
| 2016/0167784 | A1 | 6/2016 | Schliwa et al. | |
| 2016/0376007 | A1 | 12/2016 | Meindlhumer | |
| 2017/0267142 | A1 * | 9/2017 | Bowker | B60N 2/686 |
| 2017/0267143 | A1 * | 9/2017 | Bowker | B60N 2/643 |

FOREIGN PATENT DOCUMENTS

| | | |
|---|---|---|
| DE | 102010032570 | 2/2012 |
| DE | 102011116519 | 4/2013 |
| DE | 102015110369 | 11/2016 |
| DE | 102015213588 | 1/2017 |
| FR | 2962714 | 1/2012 |
| JP | H10-157 566 | 6/1998 |
| JP | 2003199642 | 7/2003 |
| JP | 2003310386 | 11/2003 |
| JP | 3106501 U | 1/2005 |
| JP | 2011115293 | 6/2011 |
| WO | 2012080135 | 6/2012 |

OTHER PUBLICATIONS

European Search Report; dated Feb. 1, 2018; priority document.
Chinese Examination Report for corresponding Chinese Patent Application No. 201711236465.7 dated Jul. 22, 2020.

* cited by examiner

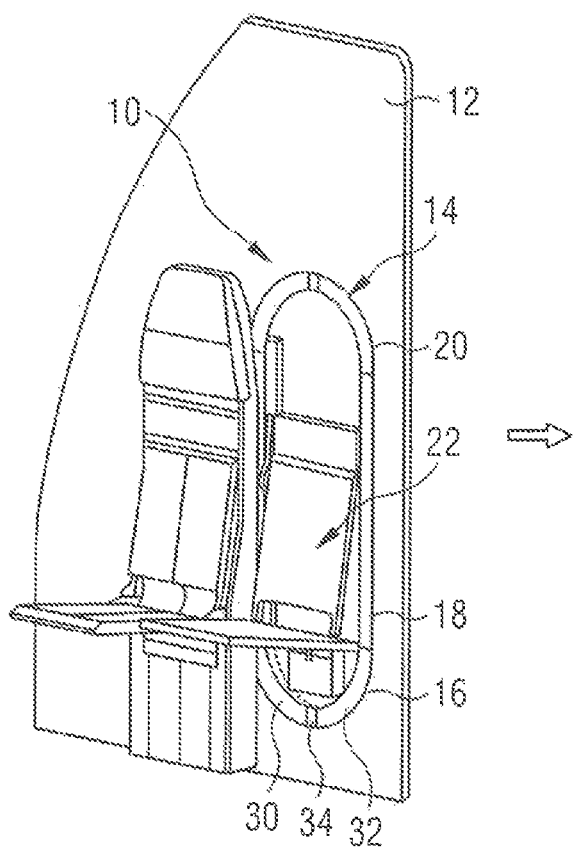
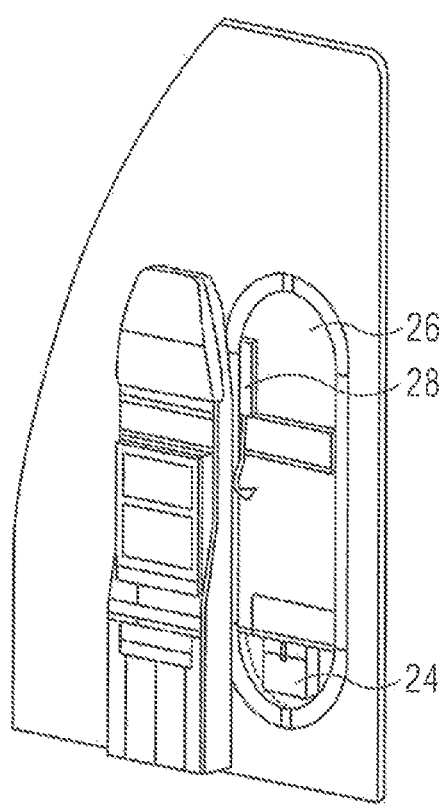

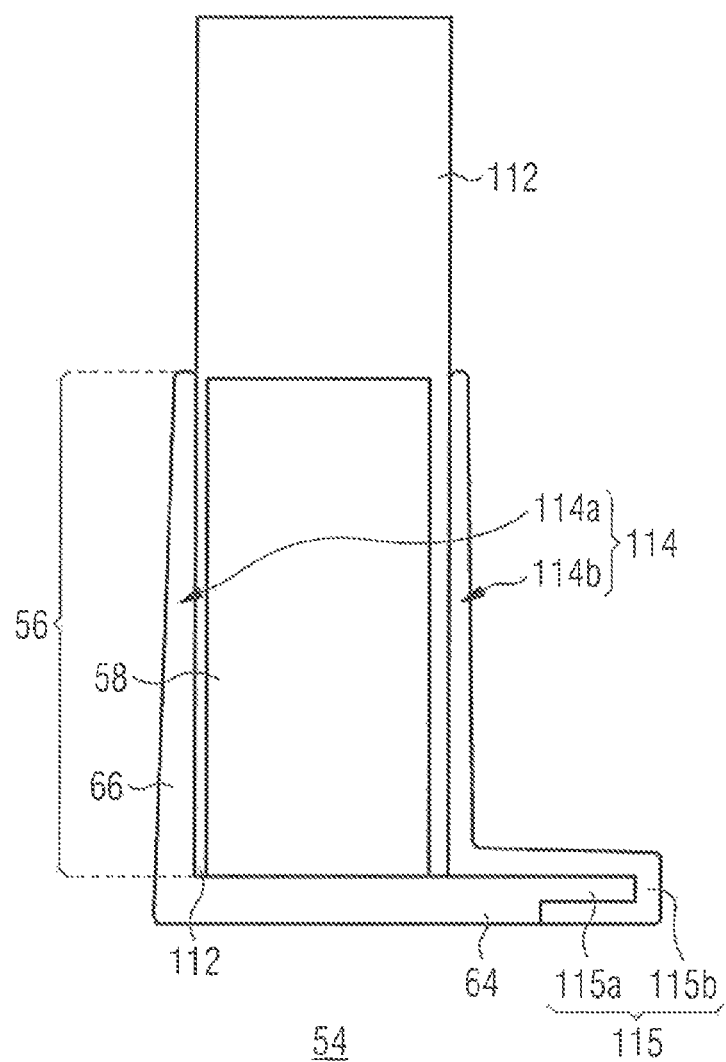

FIG 8a
FIG 8b
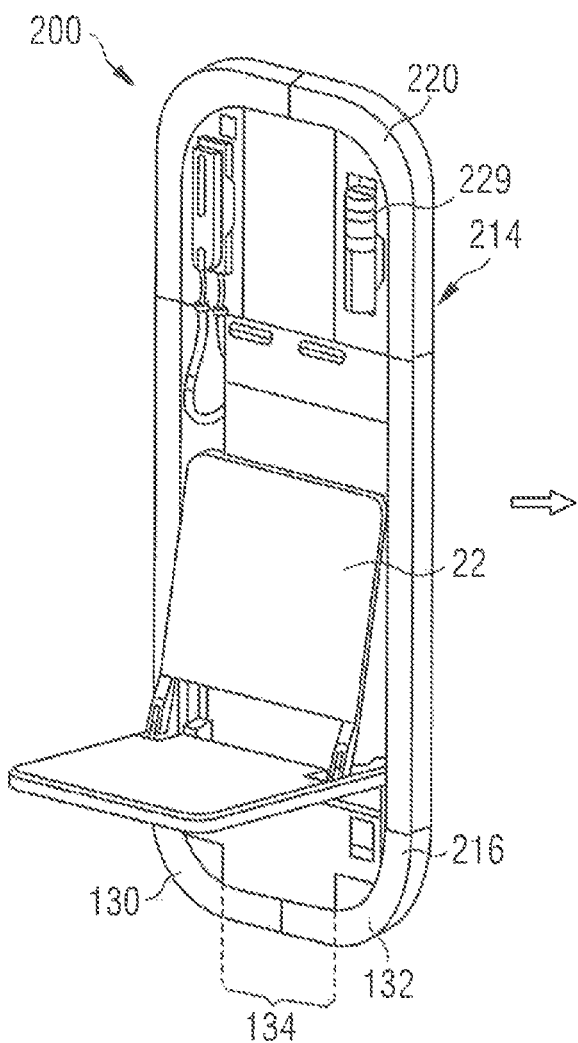
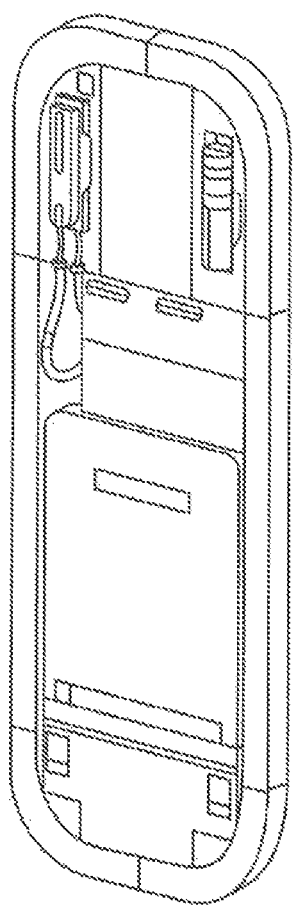

FLIGHT ATTENDANT SEAT AND METHOD FOR FITTING A FLIGHT ATTENDANT SEAT

CROSS-REFERENCES TO RELATED APPLICATIONS

This application is a continuation of U.S. patent application Ser. No. 15/825,761 filed on Nov. 29, 2017, which claims the benefit of the German patent application No. 10 2016 223 771.3 filed on Nov. 30, 2016, the entire disclosures of which are incorporated herein by way of reference.

BACKGROUND OF THE INVENTION

The invention relates to a flight attendant seat and a method for fitting a flight attendant seat.

The passenger cabin of a modern airliner is usually equipped with flight attendant seats, on which flight attendants can be seated during take-off and during landing of the aircraft. The flight attendant seats are usually arranged in the door areas of the aircraft cabin and mounted in or on an aircraft cabin wall.

A flight attendant seat with a folding seat element is known from DE 10 2005 009 750 A1 and US 2006/0202085.

Moreover, DE 10 2011 116 519 A1 and US 2014/0224931 A1 disclose a flight attendant seat, which comprises a carrier element, which comprises a backrest section and a base section that carries the backrest section. A seat element is attached to the carrier element. The carrier element is arranged as a separating element between an aircraft cabin doorway and a row of passenger seats and designed so that a free space, which is situated between the aircraft cabin floor and the rear area of the row of passenger seats and is normally unused, is formed to accommodate at least a first stowage compartment. For this purpose, a section of a rear wall of the carrier element is inclined, at least along the portion of the first stowage compartment integrated into the carrier element, in such a way that a cross-sectional area of the carrier element increases in the direction of the base section of the carrier element. In other words, a lower section of the carrier element extends into the free space usually remaining between the aircraft cabin doorway and rear side of an adjacent row of passenger seats.

Further prior art is disclosed by FR 2 962 714 A1, U.S. Pat. Nos. 1,761,673 A, 3,594,037 A and JP H10-157 566 A.

SUMMARY OF THE INVENTION

The invention is directed towards an object of providing a compact and lightweight flight attendant seat. Furthermore, the invention is directed towards an object of specifying a system and/or aircraft comprising such a flight attendant seat and of providing a simple method for the fitting of a flight attendant seat.

The flight attendant seat provided comprises a frame that can be mounted on a carrier fixture or can be integrated into the carrier fixture and at least one seat arrangement integrated into the frame, wherein the frame comprises a lower section, an upper section and a central section at least partially taking up the at least one seat arrangement. The seat arrangement preferably comprises a backrest taken up in the frame, in particular, in the central frame section, and a seat element. The backrest can be taken up over its entire height in the central section of the frame, if required, but can also project into the lower and/or upper section of the frame. The seat element is preferably likewise taken up in the frame and, in particular, provided with a folding mechanism, which makes it possible to move the seat element between a folded-up resting position and a folded-down operating position.

The flight attendant seat can comprise only one seat arrangement integrated into the frame. Alternatively to this, however, several, for example two, seat arrangements can be integrated into the frame of the flight attendant seat. Several seat arrangements are preferably taken up adjacent to one another in the frame. The frame is preferably designed so that it can be mounted on a carrier fixture provided anyway in an aircraft cabin.

In a fitted state of the flight attendant seat in an aircraft cabin, the lower section of the frame faces a floor of the aircraft cabin. In a fitted state of the flight attendant seat in an aircraft cabin, the upper section of the frame accordingly faces a roof or ceiling area of the aircraft cabin. The central section of the frame preferably connects the lower section to the upper section. The central section of the frame can accordingly comprise two sub-regions arranged at a distance from one another, for example, which in a fitted state of the flight attendant seat in an aircraft cabin extend substantially perpendicular to the floor of the aircraft cabin. The spacing of the two sub-regions of the central frame section can vary as a function of the desired design of the flight attendant seat and, in particular, as a function of the number of seat arrangements to be integrated into the frame.

The lower section of the frame is formed bent at least in a region adjoining the central section of the frame. In other words, the lower section of the frame is provided in a transition region to the central frame section, i.e., the sub-regions of the central frame section, at least with rounded corners. This has the advantage that an optimal load distribution of the seat arrangement with the person sitting on it to the carrier fixture is guaranteed, which permits, in turn, a lighter and more compact frame structure, which can be mounted satisfactorily on the carrier fixture or integrated into the carrier fixture. The formation of the lower section with a bent region also ensures that any belts hanging down are pushed in the direction of an "interior space" of the frame, i.e., can slip towards a center of the frame, so as not to block a folding mechanism of a seat element of the seat arrangement, for example.

The lower section of the frame can form the curved part of a U-shape, while the central section of the frame can form at least a portion of the substantially straight sides of the U-shape. The lower section of the frame can be bent over its entire length. Alternatively to this, however, the lower section of the frame can have a straight central area, which runs substantially parallel to the floor of the aircraft cabin in a fitted state of the flight attendant seat in an aircraft cabin. Suitably bent regions, which form lower rounded corners of the frame facing a floor of the aircraft cabin, can adjoin this straight region. To be able to conduct the load especially effectively into the carrier element, the bent regions of the lower frame section can extend, in total, over more than ¼ of the length of the lower frame section. In other words, a central region of the lower frame section connecting bent (corner) regions of the lower frame section to one another should occupy at most ¾ of the length of the lower frame section.

Furthermore, the length of a straight region provided between bent corner regions can be smaller than a width of the seat arrangement(s) at the widest point, in order to be able to ensure an optimal conduction of the load acting on the seat arrangement(s) away into the carrier fixture via the bent regions. In this case, the bent or curved regions of the lower frame section can have a radius of curvature of 50 to 150 mm, preferably roughly 100 mm, to be able to ensure an optimal load distribution and, at the same time, to be able to lead belts, which are provided on the flight attendant seat and may be hanging down, in the direction of the center of the frame into a resting position, in which they do not obstruct a movement, for example a folding movement, of a seat element of the seat arrangement(s).

Like the lower section of the frame, the upper section of the frame can also be formed bent, at least in a region adjoining the central section of the frame. In other words, the upper section of the frame is also preferably provided at least with rounded corners in a transition region to the central frame section, i.e., the subsections of the central frame section.

The upper section and the lower section of the frame can be formed in mirror symmetry relative to a transverse axis of the frame, which extends substantially parallel to a floor of the aircraft cabin in a fitted state of the flight attendant seat in an aircraft cabin. Alternatively to this, the upper section and the lower section of the frame can also be formed differently, however. The shape, i.e., in particular, the degree of bending (the radius of curvature) of the bent region of the respective section depends on the prevailing loads and their required efficient conduction into the carrier structure. At the same time, on account of the bending, the respective size of the lower and the upper section can also be determined, so that optionally only one seat arrangement or a plurality of seat arrangements can be arranged in the frame and accessories and equipment necessary for the flight operation can be integrated in the upper or the lower frame section.

A life jacket can thus be accommodated in the lower section, while a headrest and a communication device, for example, can be accommodated in the upper section. Instead of in the lower section, the life jacket can also be accommodated in the upper section and thus serve at the same time as a headrest, for example behind a cover, which makes the flight attendant seat even more compact. The advantage of identically shaped or bent sections lies in the fact that fitting is made easier, as the frame, or at least certain frame elements of the frame, can be rotated 180° for installation. At the same time, identically shaped or bent sections permit a simpler development of a suitable frame, as the frame can thus be symmetrical with reference to two planes perpendicular to one another and the calculation or design of the frame is simplified.

The bent regions of the lower and, if applicable, also the upper frame section can be quadrant-shaped.

The frame can have a first part, in particular, which is formed as a closed flat metal sheet. In a state of the frame mounted on the carrier fixture, the first part of the frame can extend substantially parallel to a surface of the carrier fixture taking up the frame.

Moreover, the frame can have a second part, which is formed as a flange section to the first part and can abut one side of the carrier fixture. This flange section can be circumferential in one plane. In this case the second part can project outwards from the first section. In particular, the second part of the frame can extend, in a state of the frame mounted on the carrier fixture, substantially perpendicular to a surface of the carrier fixture into which the frame is integrated. Due to this flange section, the tolerances of the frame can be more generous, as the flange section can cover a region of the carrier fixture that is adjacent to an opening formed in the carrier fixture for taking up the frame.

The frame can also be constructed of several congruous frame elements. In this way, very similar frame elements can be manufactured, which can be stored and transported together in a space-saving manner. Furthermore, the frame elements can be pluggable into one another, for example in that identical frame elements are used, which reduces the costs, the calculation and the manufacturing effort of such a frame, wherein the fitting is additionally simplified as frame elements can be connected in any way. Furthermore, the frame can be designed so that two frame elements can be inserted from opposing sides of the carrier fixture into an opening formed in the carrier fixture and connected to one another. For example, a first frame element, on which the seat arrangement can be mounted exclusively, and which has fixed dimensions, can be placed into a through opening formed in the carrier fixture from a first side of the carrier fixture. A second frame element can then be introduced into the through opening from the opposite side of the carrier fixture to secure the first frame element and can be connected to the frame element carrying the seat arrangement. The form of the second frame element can be selected as a function of the thickness of the carrier fixture.

The frame or the frame elements can have a cross section formed as an L-shape preferably on each frame (element) side. Here, the two limbs of the L-shaped cross section can be at a right or obtuse angle to one another, in order to guarantee their pluggability.

The frame elements can have a complementary plug connection, preferably at their free ends. The plug connection can be formed so that a lip-shaped undercut of one frame element is taken up in a clamped manner by an undercut of another frame element connected thereto.

The flight attendant seat can comprise several, preferably two, seat arrangements integrated into the frame adjacent to one another. Each seat arrangement can, as discussed above, have a backrest and a seat element, wherein the seat element of each seat arrangement is swivellable, preferably by means of a folding mechanism between a folded-up resting position and a folded-down operating position. The two seat arrangements can directly adjoin one another. Alternatively to this, however, it is also conceivable to arrange the two seat arrangements at a defined distance from one another in the frame.

A system according to the invention comprises a carrier fixture as well as a flight attendant seat described above. The flight attendant seat is mounted on the carrier fixture or integrated into the carrier fixture.

If the flight attendant seat is integrated into the carrier fixture, the flight attendant seat is arranged, in particular, inside a through opening formed in the carrier fixture. In a preferred embodiment of the system, the frame of the flight attendant seat surrounds a through opening formed in the carrier fixture. The frame can comprise a first frame element carrying the at least one seat arrangement. Furthermore, the frame can comprise a second frame element, which is used to fasten the first frame element carrying the at least one seat arrangement to the carrier fixture. The first and the second frame element then preferably abut opposed surfaces of the carrier fixture. A system formed in such a way is characterized by a particularly small installation space requirement, in particular a small installation depth. The system is therefore particularly good for fitting in an aircraft cabin subject to especially rigorous installation space restrictions.

In an alternative embodiment of the system, the flight attendant seat is mounted on a surface of the carrier fixture, wherein the flight attendant seat can even be taken up, at least partially, in a recess formed in the surface of the carrier fixture. A system designed in such a way has a greater installation depth than a system in which the frame with the seat arrangement integrated into it is integrated into the carrier fixture, but is easier to fit and more flexibly configurable, for example if the flight attendant seat is to comprise several seat arrangements.

The carrier fixture carrying the flight attendant seat can be any carrier structure that can be fitted in an aircraft cabin, in particular, an aircraft cabin wall. However, the carrier fixture is preferably a component that is installed in the aircraft cabin anyway. In particular, the carrier fixture can be constructed in the form of a partition wall or in the form of a wall of a monument provided for fitting in an aircraft cabin.

An aircraft can comprise a flight attendant seat described above and/or a system described above comprising a carrier fixture and a flight attendant seat.

The method according to the invention for fitting a flight attendant seat comprises the following steps:
  mounting of a frame on a carrier fixture or integration of the frame into it, wherein the frame comprises a lower section, an upper section and a central section and wherein the lower section is formed bent at least in a region adjoining the central section; and
  integration of at least one seat arrangement into the frame, in that the seat arrangement is inserted at least partially into the central section of the frame.

The method can optionally comprise the following steps:
  provision of a through opening complementary to a frame in the carrier fixture;
  insertion of a first frame element into the through opening from a first side of the carrier fixture;
  insertion of a second frame element congruous with the first frame element into the through opening from a second side of the carrier fixture opposite to the first side; and
  fixing of the frame elements to one another.

The fixing can be achieved here by adhesive, screws, or a combination of both.

In addition, before the insertion of a first frame element into the through opening, the following steps can be taken:
  sealing of a honeycomb structure of the carrier fixture exposed due to the through opening; and
  introduction of a filler into a region of the carrier fixture along the through opening, which region is covered by a frame fixed to the carrier fixture.

The at least one seat arrangement can be installed in the first frame element before the first frame element is inserted into the through opening, or installed in the frame after the frame elements have been fixed to one another.

BRIEF DESCRIPTION OF THE DRAWINGS

Preferred embodiments of the invention are now explained in greater detail with reference to the enclosed drawings. Identical elements are provided here with the same reference signs and similar elements with similar reference signs.

FIGS. 2a-b show a comparison of a conventional flight attendant seat (FIG. 2a—left) and the flight attendant seat from FIG. 1 (FIG. 2a—right), wherein the seats are shown both folded down (FIG. 2a) and folded up (FIG. 2b), FIG. 7 shows a cross section through the frame in its state mounted on the carrier fixture, in particular, a complementary plug connection of two frame elements forming the frame with a carrier fixture and filling region located in between, FIGS. 8a-8b show a third embodiment of a flight attendant seat, wherein the seat is shown both folded down (FIG. 8a) and folded up (FIG. 8b), which embodiment differs from the second embodiment from FIGS. 3a-b in that the upper section of the frame is congruous with the lower section.

DETAILED DESCRIPTION OF THE PREFERRED EMBODIMENTS

Figure 1:
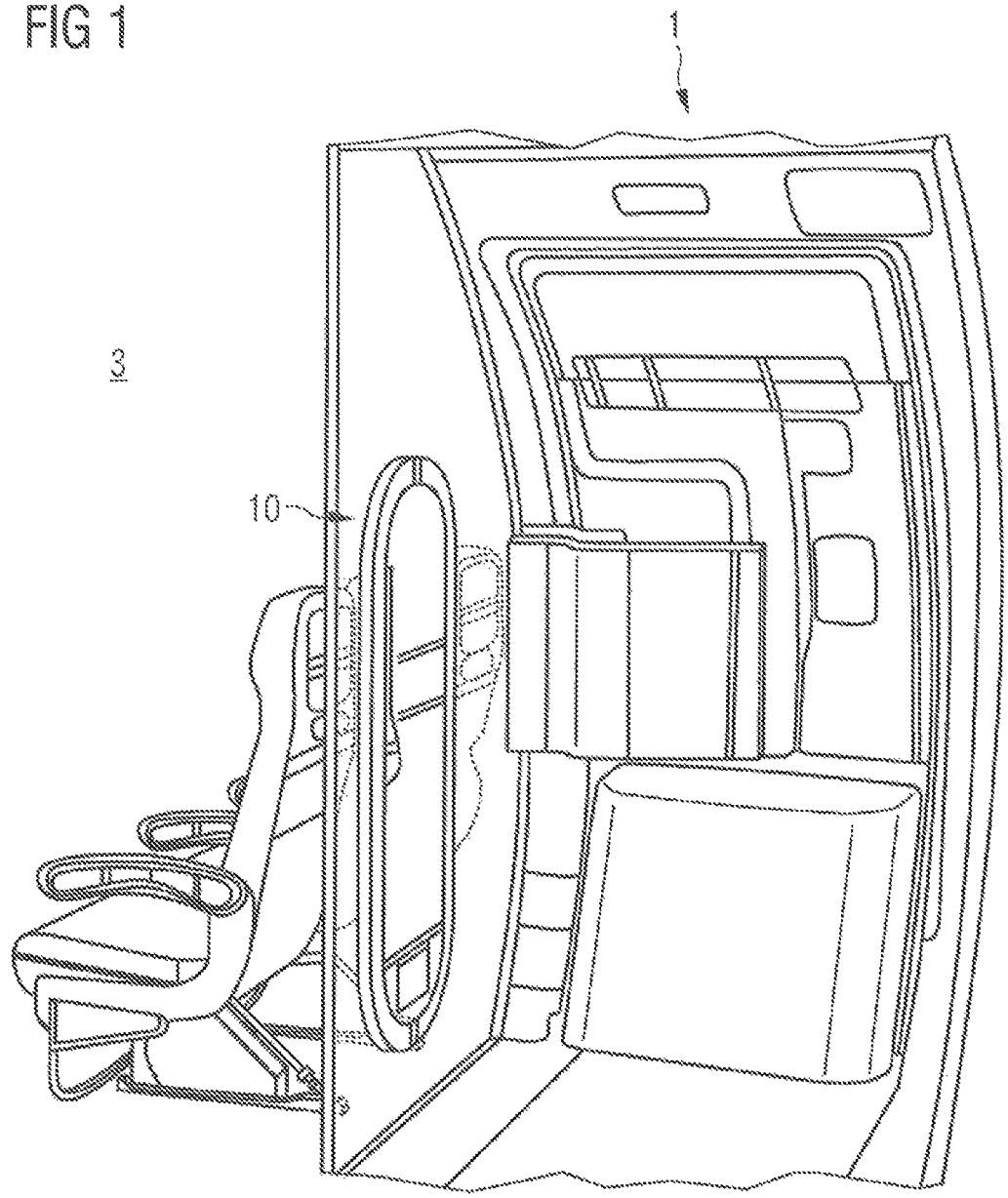
FIG. 1 shows a door area of an aircraft cabin with a first embodiment of the flight attendant seat.

FIG. 1 shows a door area 1 of an aircraft cabin 3 with a system of a first embodiment of a flight attendant seat 10.

FIGS. 2a-b show a comparison of a conventional flight attendant seat (FIG. 2a—left) and the flight attendant seat 10 from FIG. 1 (FIG. 2a—right), wherein the seats are shown both folded down (FIG. 2a), i.e. in an operating position, and folded up (FIG. 2b), i.e. in a resting position.

It is to be recognized in these figures that the flight attendant seat 10 can be mounted on a carrier fixture 12. The carrier fixture 12 is constructed here in the form of an aircraft cabin wall, i.e., in the form of a partition wall. A frame 14 of the flight attendant seat 10 is integrated into the carrier fixture 12. The frame 14 has three sections: a lower section 16, a central section 18, and an upper section 20.

Figure 4A:
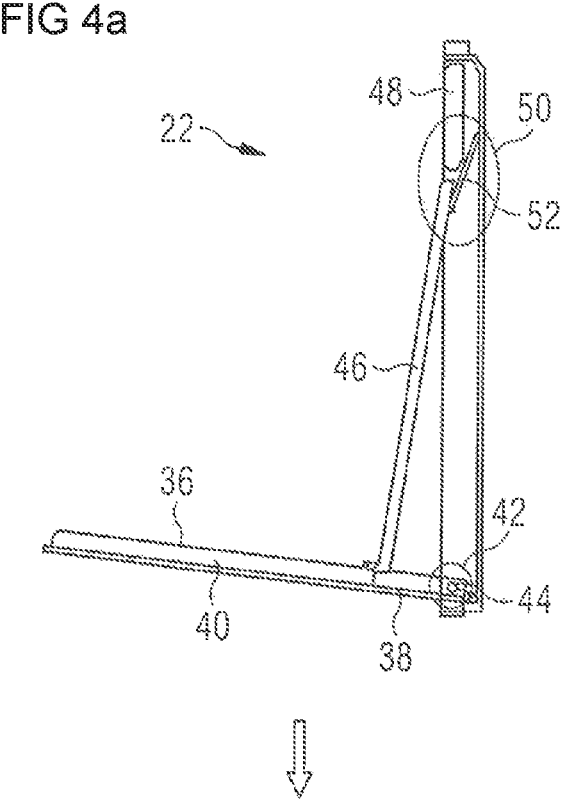
FIGS. 4a-b show the kinematics of a seat arrangement integrated into the flight attendant seat, wherein both the folded-down state (FIG. 4a) and an intermediate and folded-up state (FIG. 4b) are shown.
Figure 4B:
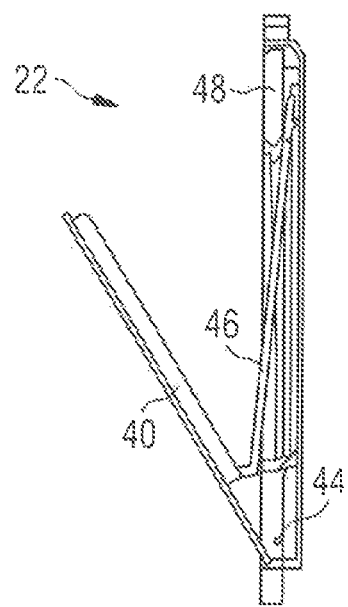

The central section 18 takes up a seat arrangement 22 at least partially. The seat arrangement 22 comprises a backrest and a seat element. The seat element is movable back and forth relative to the frame 14 between an operating position permitting use by a flight attendant and a resting position, wherein it can be folded down and up, in particular, as shown in FIGS. 4a-b.

A life jacket 24 is accommodated within the lower section 16 of the frame 14 in this first embodiment.

A headrest 26 and a communication device 28 are accommodated within the upper section 20 of the frame 14 in this first embodiment.

The lower section 16 of the frame 14 is formed bent at least in a region adjoining the central section 18. Here the lower section 16 and the upper section 20 are bent identically in a U-shape. Two regions 30, 32, which are bent in a quadrant shape and connected to one another by a straight central region 34, are present in both the lower section 16 and the upper section 20. The lower section 16 and the upper section 20 face each other with the opening of the U-shape and are spaced from one another as well as connected to one another by the central section 18.

Figure 3A:
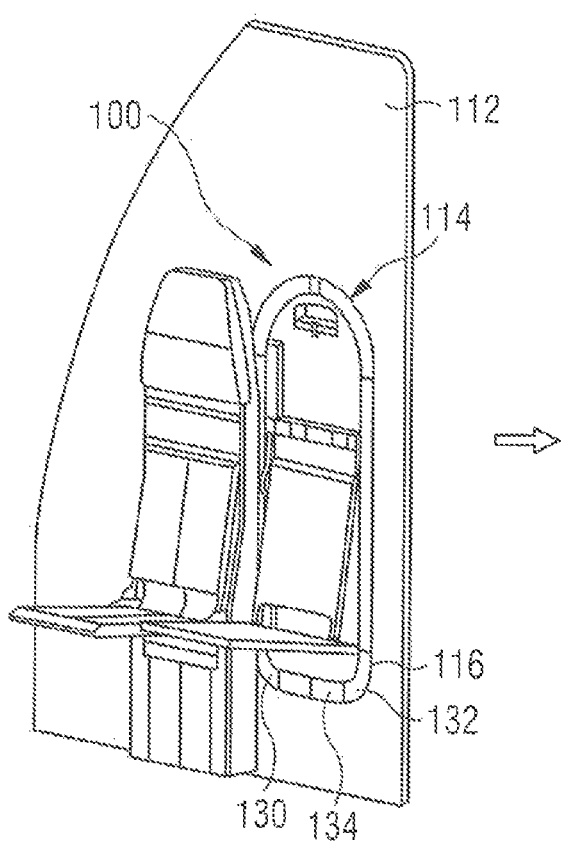
FIGS. 3a-b show a comparison of a conventional flight attendant seat (FIG. 3a left) and a flight attendant seat according to a second embodiment (FIG. 3a—right), wherein the seats are shown both folded down (FIG. 3a) and folded up (FIG. 3b)
Figure 3B:
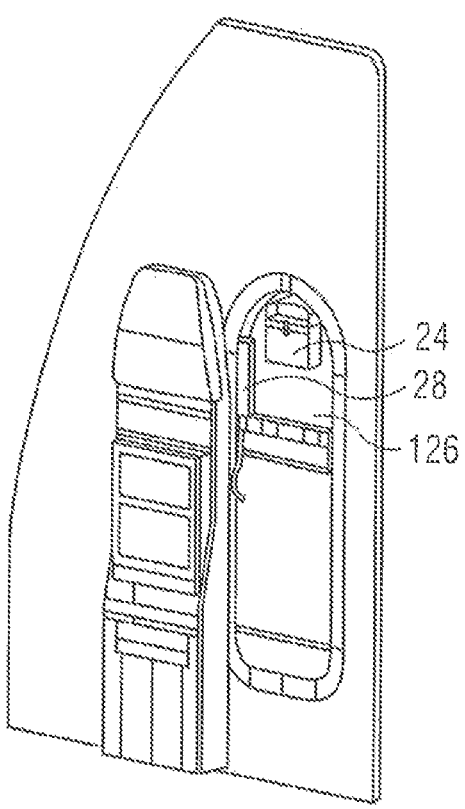

FIGS. 3a-b show a comparison of a conventional flight attendant seat (FIG. 3a—left) and a flight attendant seat 100 according to a second embodiment (FIG. 3a—right), wherein the seats are shown both folded down (FIG. 3a), i.e. in an operating position, and folded up (FIG. 3b), i.e., in a resting position.

The differences from the first embodiment lie in the fact that the lower section 116 of the frame 114 and the upper section 20 of the frame 114 differ, and in the fact that the life jacket 24 is accommodated not in the lower section 116 of the frame 114 but in the headrest 126.

In particular, the central region 134 of the lower section 116 is longer than the central region 34 of the upper section 20, so that the bent regions 130, 132 of the lower section 116 have a smaller bending radius than the bent regions 30, 32 of the upper section 20.

FIGS. 4a-b show the kinematics of a seat arrangement 22 integrated into the flight attendant seat 10, 100, wherein the folded-down state (FIG. 4a) and an intermediate, as well as a folded-up state (FIG. 4b) are shown.

The seat arrangement 22 has a seat element 36, which has a rigid seat carrier 38 and a seat cushion 40 attached thereto. The seat carrier 38 has a mounting 42 with a shaft 44 at one end. The shaft 44 runs transversely in the central section 18 of the frame 14, 114. The seat cushion 40 is spaced at a distance from the mounting 42 and the shaft 44 and is attached to the seat carrier 38.

At the end of the seat cushion 40 nearest to the shaft 44, a lower backrest 46 is mounted pivotably on the seat cushion 40. The seat arrangement 22 also has an upper backrest 48, which is mounted fixedly in the central section 18 of the frame 14, 114. Finally, the seat arrangement 22 has a guide section 50 with a guide element 52 for the lower backrest 46. This guide section 50 is formed by the upper backrest 48 and the guide element 52, with a space in between, which is dimensioned so that the lower backrest 46 can be pushed through it when the seat arrangement 22 is folded up or closed. This is shown, in particular, in the intermediate and closed state shown in FIG. 4b. The seat arrangement 22 can be accommodated compactly within the frame 14, 114 in this way. Furthermore, the load applied to the seat element 36 is conducted via the seat carrier 38 and the shaft 44 of the mounting 42 into the central section 18 of the frame 14, 114, from there into the lower section 16, 116 of the frame 14, 114 and further into the carrier element 12, 112.

Methods for fitting one of the aforesaid flight attendant seats 10, 100 are described below.

FIGS. 5a-g show a first method for fitting a flight attendant seat 100 according to the second embodiment from FIGS. 3a-b, wherein the method also applies to a flight attendant seat 10 according to the first embodiment from FIGS. 2a-b.

In a preparatory step, which is not shown, a through opening 54 complementary to the frame 114 is created in the carrier fixture 112. Since it is an aircraft cabin wall in this case, this usually has an internal honeycomb structure, which is exposed due to the through opening 54. For this reason, the honeycomb structure of the carrier fixture 112 is sealed following the creation of the through opening 54. In a further step, not shown, a filler 58 is introduced into a region 56 of the carrier fixture 112 along the through opening 54, which region is shown in FIG. 7 and will be covered by a frame 114 fixed to the carrier fixture 112. The filler 58 is intended to reinforce the carrier fixture 112 at this point.

Figure 5A:
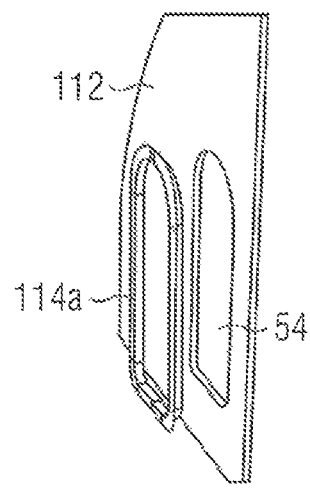
FIGS. 5a-g show a first method for fitting a flight attendant seat according to the second embodiment from FIGS. 3a-b, FIGS. 6a-d show a second method for fitting a flight attendant seat according to the second embodiment from FIGS. 3a-b.
Figure 5B:
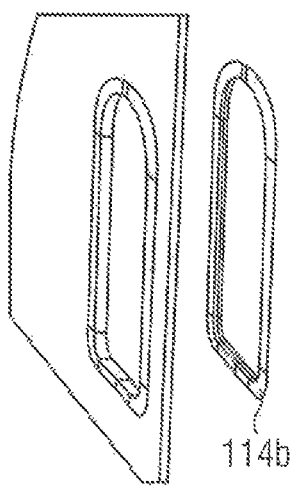
Figure 5C:
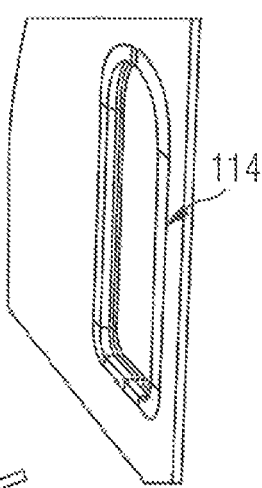

The actual fitting of the frame 114 begins in FIG. 5a with the insertion of a first frame element 114a into the through opening 54 from a first side of the carrier fixture 112. In FIG. 5b a second frame element 114b is then inserted into the through opening 54 from a second side of the carrier fixture 112 opposite to the first side. In FIG. 5c the complete frame 114 is thus inserted with the carrier fixture 112 in between, so that the frame elements 114a, 114b are fixed to one another, for example by adhesive, screws, or a combination of both. One option for fastening of the frame elements 114a, 114b is shown in FIG. 7 and is explained in greater detail.

Figure 5D:
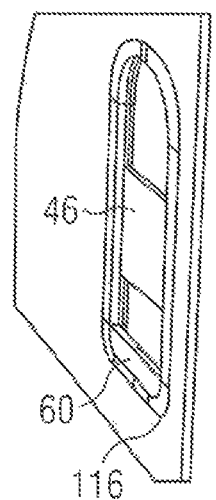
Figure 5E:
Figure 5F:
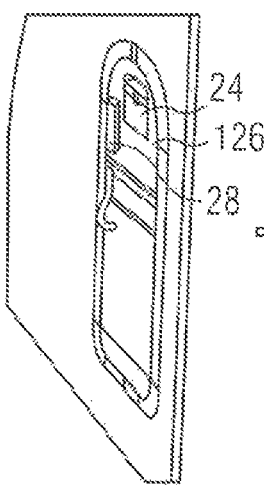
Figure 5G:
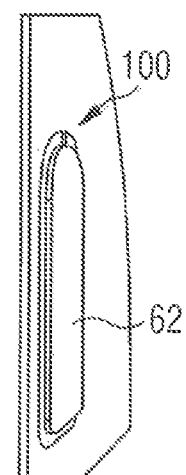
Figure 6A:
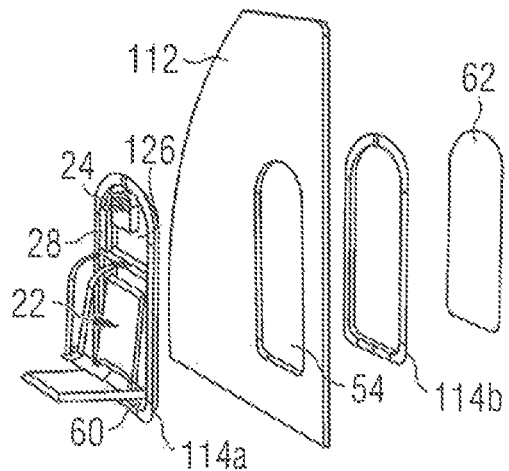
Figure 6B:
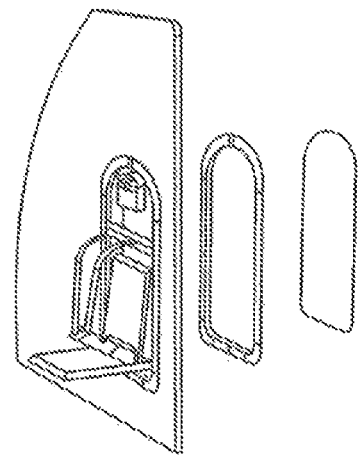
Figure 6C:
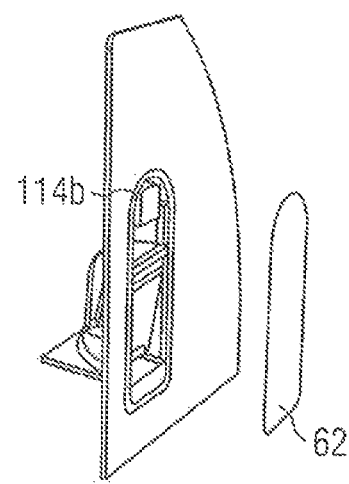
Figure 6D:
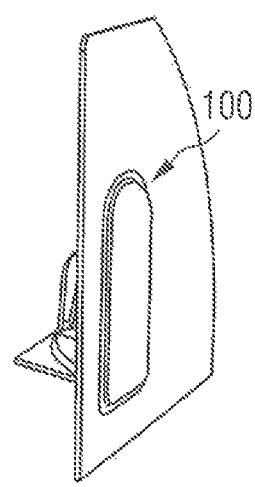

In FIGS. 5d-e the lower section 116 is then closed by a lower cover 60 flush with the first frame element 114a and the seat arrangement 22 placed into the central section 18 of the frame 114, so that this also ends flush with the first frame element 114a. In a penultimate step shown in FIG. 5f, the headrest 126 with the integrated life jacket 24 and communication device 28 is placed into the upper section 20 of the frame 114. In a last step shown in FIG. 5g, the frame 114 is closed on the second side of the carrier fixture 112 by a cover 62.

FIGS. 6a-d show a second method for fitting a flight attendant seat 114 according to the second embodiment from FIGS. 3a-b. This second method is an alternative method to the first method and differs from the first method in that all aforesaid components to be accommodated inside the frame 114 are fitted to the first frame element 114a before the first frame element 114a is inserted into the through opening 54.

FIG. 7 shows a cross section through the frame 114 in its state mounted on the carrier fixture 112. In particular, FIG. 7 shows the complementary plug connection of both frame elements 114a, 114b forming the frame 114 with the carrier fixture 12, 112 and the filling region 56, filled with filler 58, located in between.

Both frame elements 114a, 114b have an L-shape in their cross section. This L-shape has as a base line a first region 64, which forms a frame basic body and extends in the form of a plate. To ensure the force-distributing basic function of the frame 114, at least this frame basic body 64 is required. A tapering second region 66 formed as a flange section extends perpendicularly outwards flush with a first end of this frame basic body 64. This limiting body 66 serves to prevent a falling-out of the frame basic body 64 inserted in the through opening 54 at least towards the second side of the carrier fixture 112. A second end 115a opposite to the first end of the frame basic body 64 is stepped on the inside of the frame basic body 64.

The second frame element 114b is substantially congruous with the first frame element 114a. The main difference lies in the fact that the second end 115b of the frame basic body 64 of the second frame element 114b extends inwards and towards the first frame element 114a in a hook shape, so that the stepped section of the second end of the frame basic body 64 of the first frame element 114a can be taken up in this hook or undercut in a positive-locking manner A plug connection 115 is thus created. On account of this connection, a larger area is available for gluing both frame elements 114a, 114b. Alternatively or in addition, a screw connection can also be provided, wherein this can be provided through the two ends parallel to the direction of extension of the carrier fixture 112, so that holes in the carrier fixture 112 can be eliminated.

FIGS. 8a-8b show a third embodiment of a flight attendant seat 200, wherein the seat 200 is shown both folded down (FIG. 8a) and folded up (FIG. 8b), which embodiment differs from the second embodiment from FIGS. 3a-b in that an upper section 220 of the frame 214 is congruous with the lower section 116. In addition, further accessories, for example a flashlight 229, are integrated within the upper section 220. The interior of the upper section 220 and/or the lower section 216 is thus constructed in a modular manner, which is generally applicable to all embodiments disclosed. Even more space can be saved by this and at the same time any immediately important equipment for a flight attendant can be integrated into the flight attendant seat as required.

Figure 9A:
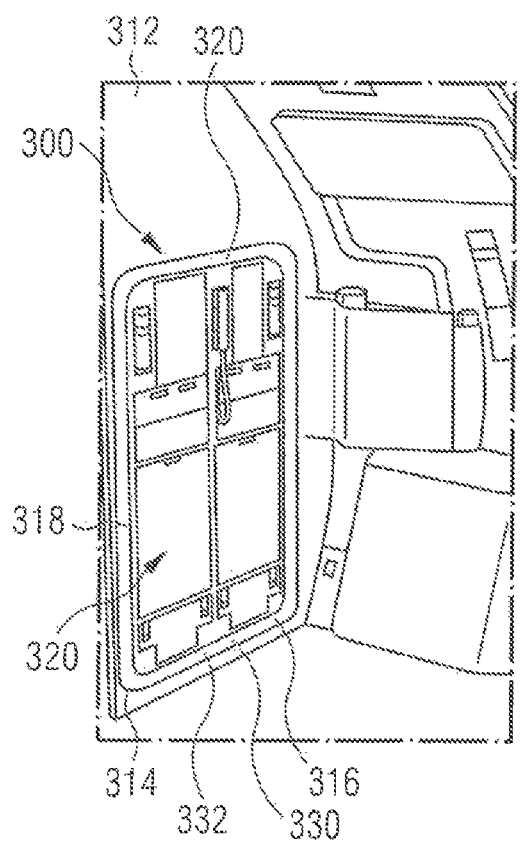
FIGS. 9a-9b show a fourth (FIG. 9a) and fifth (FIG. 9b) embodiment of a flight attendant seat, each with two seat arrangements, wherein the fourth embodiment (FIG. 9a) is integrated into a carrier fixture and the fifth embodiment (FIG. 9b) is mounted on one side of a carrier fixture.
Figure 9B:
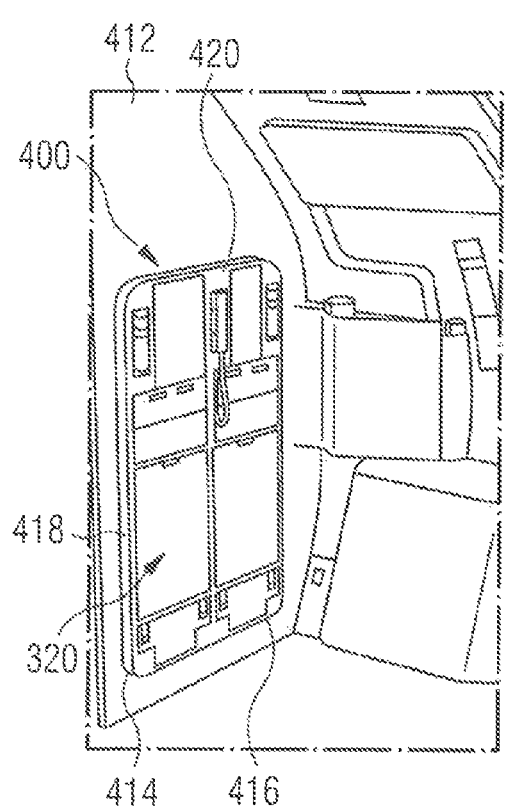

FIGS. 9a-9b show a fourth (FIG. 9a) and fifth (FIG. 9b) embodiment of a flight attendant seat 300, 400, each with two seat arrangements 320, 420, wherein the fourth embodiment (FIG. 9a) is integrated corresponding to the previously cited embodiments into a carrier fixture 312 and the fifth embodiment (FIG. 9b) is mounted on one side of a carrier fixture 412. The latter thus requires no through opening 54. Here the lower section 316, similar to the aforesaid embodiments, can have two U-shaped lower sections arranged next to one another, in order to obtain said advantages of the load distribution and belt accommodation for each of the seat arrangements 320, which can be folded down individually. Alternatively, central bent regions, which are not shown, can be provided between the two seat arrangements 320 as elements fitted additionally in a center of the lower section 416.

The carrier fixture 12, 112, 312, 412 in the present case has a depth/thickness of 1.1 inches (27.9 mm) The first to the fourth embodiments of the flight attendant seat 10, 100, 200, 300 protrude in this case by at most roughly 0.87 inches (22.1 mm) from the carrier fixture 12, 112, 312, 412. The fifth embodiment of the flight attendant seat 400 has a depth/thickness of 2.12 inches (53.9 mm) maximum. The depths/thicknesses of all embodiments realized here thus lie significantly below the normal thickness/depth of a usual flight attendant seat of 4.1 inches (104.1 mm).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system comprising:
a carrier fixture having an opening, wherein the carrier fixture is a monument wall or a partition wall, and
a folding flight attendant seat comprising:
a frame integrated into the opening of the carrier fixture, and
at least one seat arrangement integrated into the frame, wherein the frame comprises a lower section, an upper section, and a central section taking up the at least one seat arrangement at least partially,
wherein the lower section is formed bent at least in a region adjoining the central section and forms the curved part of a U-shape, the lower section forming a support for the flight attendant seat configured to conduct a load into the carrier fixture via the lower section, and
wherein the central section forms at least a portion of the substantially straight sides of the U-shape.

2. The system according to claim 1, wherein the lower section is formed bent over its entire length.

3. The system according to claim 1, wherein the lower section has a straight central region which connects bent regions of the lower section to one another, and
wherein bent regions of the lower section extend in total over more than a quarter of a length of the lower section, and wherein the central region of the lower section occupies at most three quarters of the length of the lower section.

4. The system according to claim 3, wherein the bent regions of the lower frame section each have a radius of curvature of about 50 to about 150 mm.

5. The system according to claim 1, wherein the upper section and the lower section of the frame are formed differently, or
wherein the upper section of the frame is formed bent at least in a region adjoining the central section of the frame.

6. The system according to claim 5, wherein the upper section and the lower section of the frame are formed in mirror symmetry relative to a transverse axis of the frame.

7. The system according to claim 1, wherein the frame has a surrounding flange section.

8. The system according to claim 1, wherein the frame is constructed from several congruous frame elements.

9. The system according to claim 8, wherein the frame elements have a substantially L-shaped cross section.

10. The system according to any one of claim 1, which comprises two seat arrangements integrated into the frame adjacent to one another.

11. The system according to claim 1, wherein the frame of the folding flight attendant seat surrounds a through opening formed in the carrier fixture.

12. An aircraft with the system according to claim 1.

13. A method for fitting a folding flight attendant seat in a carrier fixture, the carrier fixture being a monument wall or a partition wall, comprising:
integrating a frame into an opening of the carrier fixture, wherein the frame comprises a lower section, an upper section and a central section, wherein the lower section is formed bent at least in a region adjoining the central section, and forms the curved part of a U-shape, the lower section forming a support for the folding flight attendant seat configured to conduct a load into the carrier fixture via the lower section, and wherein the central section forms at least a portion of the substantially straight sides of the U-shape, and
integration of at least one seat arrangement into the frame, in that the seat arrangement is inserted at least partially into the central section of the frame.

14. The method according to claim 13, further comprising:
inserting a first frame element into the opening from a first side of the carrier fixture;
inserting a second frame element congruous with the first frame element into the opening from a second side of the carrier fixture opposite to the first side; and
fixing the frame elements to one another.

15. The method according to claim 13, further comprising:
forming the lower section of the frame with a straight central region, which connects bent regions of the lower section to one another and runs substantially parallel to a floor of an aircraft cabin in a fitted state of the folding flight attendant seat in the aircraft cabin.

16. The method according to claim 15, further comprising:

forming the bent regions of the lower section to extend in total over more than a quarter of a length of the lower section, and forming the central region of the lower section to occupy at most three quarters of the length of the lower section.

* * * * *